(12) United States Patent
Nishi et al.

(10) Patent No.: US 11,150,353 B2
(45) Date of Patent: Oct. 19, 2021

(54) TIME SYNCHRONIZATION DEVICE, AND METHOD AND PROGRAM THEREFOR

(71) Applicant: NIPPON TELEGRAPH AND TELEPHONE CORPORATION, Tokyo (JP)

(72) Inventors: Keisuke Nishi, Tokyo (JP); Youichi Fukada, Tokyo (JP); Akihiro Morita, Tokyo (JP); Seiji Yoshida, Tokyo (JP); Takashi Hirose, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 607 days.

(21) Appl. No.: 15/543,333

(22) PCT Filed: Feb. 12, 2016

(86) PCT No.: PCT/JP2016/054091
§ 371 (c)(1),
(2) Date: Jul. 13, 2017

(87) PCT Pub. No.: WO2016/129665
PCT Pub. Date: Aug. 18, 2016

(65) Prior Publication Data
US 2017/0350984 A1    Dec. 7, 2017

(30) Foreign Application Priority Data

Feb. 13, 2015    (JP) .............................. JP2015-026137

(51) Int. Cl.
*G04G 3/02*        (2006.01)
*G01S 19/14*       (2010.01)
(Continued)

(52) U.S. Cl.
CPC .............. *G01S 19/14* (2013.01); *G01S 19/34* (2013.01); *G01S 19/39* (2013.01); *G04G 3/02* (2013.01);
(Continued)

(58) Field of Classification Search
CPC ........ G04R 20/02; G04R 20/04; G04R 20/06; G04R 20/16; G06F 1/14
See application file for complete search history.

(56) References Cited

U.S. PATENT DOCUMENTS 6,480,145 B1 * 11/2002 Hasegawa ............. G01S 19/235
342/357.62
8,773,955 B2 * 7/2014 Baba ....................... G04R 20/04
368/47
(Continued)

FOREIGN PATENT DOCUMENTS

JP          3069983 U      7/2000
JP          3938085 B2     6/2007
(Continued)

OTHER PUBLICATIONS

Tomohiro Hakamata, Yusuke Konishi, Suh Yongcheol, and Ryosuke Shibasaki, "Improvement of a GNSS Utility Evaluation Simulation System Using a Three-Dimensional Map", Geoinformation Forum Japan 2003, Student Forum, Center for Spatial Information Science, Tokyo University, Jun. 11, 2003, with partial translation.
(Continued)

*Primary Examiner* — Lester G Kincaid
*Assistant Examiner* — Dung L Lam
(74) *Attorney, Agent, or Firm* — Harness, Dickey & Pierce, P.L.C.

(57) ABSTRACT

A time synchronization method that is capable of selecting whether synchronization, by a timepiece unit that generates a time signal synchronized with a standard time and outputs
(Continued)

it to an exterior, with the time is performed by time information obtained by receiving a radio wave including information relating to the time, or is performed by means of a holdover performed using a clock signal from an internal or external clock source. A schedule having a first time period in which the above-mentioned time information is used, and a second time period by means of the holdover is determined according to temporal reception characteristics of the radio wave at a reception location of the radio wave, and according to the schedule, supplying the timepiece unit with the time information or supplying the timepiece unit with the clock signal from the internal or external clock source.

8 Claims, 5 Drawing Sheets

(51) Int. Cl.
| | | |
|---|---|---|
| *G01S 19/34* | (2010.01) | |
| *G06F 1/14* | (2006.01) | |
| *G04R 20/16* | (2013.01) | |
| *G04R 20/04* | (2013.01) | |
| *G04R 20/06* | (2013.01) | |
| *G01S 19/39* | (2010.01) | |
| *G04R 20/02* | (2013.01) | |
| *G04G 5/00* | (2013.01) | |
| *G04G 7/00* | (2006.01) | |

(52) U.S. Cl.
CPC ............... *G04G 5/00* (2013.01); *G04G 7/02* (2013.01); *G04R 20/02* (2013.01); *G04R 20/04* (2013.01); *G04R 20/06* (2013.01); *G04R 20/16* (2013.01); *G06F 1/14* (2013.01)

(56) References Cited

U.S. PATENT DOCUMENTS

| | | | |
|---|---|---|---|
| 2011/0170465 A1* | 7/2011 | Tavildar | H04W 56/0015 370/311 |
| 2013/0009816 A1 | 1/2013 | Hagita et al. | |
| 2013/0052944 A1* | 2/2013 | Baba | G01S 19/34 455/12.1 |

FOREIGN PATENT DOCUMENTS

| | | |
|---|---|---|
| JP | 2010-112834 A | 5/2010 |
| JP | 2011-182099 A | 9/2011 |
| JP | 2011-208949 A | 10/2011 |
| JP | 2012-202814 A | 10/2012 |
| JP | 2012-215560 A | 11/2012 |

OTHER PUBLICATIONS

C.W.T. Nicholls and G.C. Carleton, "Adaptive OCXO Drift Correction Algorithm", 2004 IEEE International Ultrasonics, Ferroelectrics, and Frequency Control Joint 50th Anniversary Conference, pp. 509-517, 2004.

EDN Japan, "Network Timing Management", ITmedia Inc., [online], [searched Jan. 18, 2015], Internet <URL:http://ednjapan.com/edn/articles/0611/01/news151.html> with partial translation.

Nobuaki Kubo, Akio Yasuda, and Takashi Suzuki, "The possibility of the Precise Positioning and Multipath Error Mitigation", IEICE Technical Report, ITS2004-8, pp. 7-12, Jul. 2004, with abstract.

H. Izumikawa and Y. Kishi, "Green-Canes: Adaptive Activation Controls of Macro/Femtocell Base Stations for Energy Savings", IEICE Technical Report, NS2009-257, pp. 533-536, Mar. 2010.

Renata Pelc-Mieczkowska, "Primary results of using hemispherical photography for advanced GPS mission planning", the 9th International Conference "Environmental Engineering", Vilnius Gediminas Technical University, May 2014.

International Search Report for PCT/JP2016/054091, ISA/JP, Tokyo, Japan, dated May 17, 2016, with English translation.

\* cited by examiner

TIME SYNCHRONIZATION DEVICE, AND METHOD AND PROGRAM THEREFOR

CROSS-REFERENCE TO RELATED APPLICATIONS

This application is a 371 U.S. National Stage of International Application No. PCT/JP2016/054091, filed on Feb. 12, 2016, which claims the benefit of and priority to Japanese Patent Application No. 2015-026137, filed on Feb. 13, 2015. The disclosures of the above applications are incorporated herein by reference.

TECHNICAL FIELD

The present invention relates to a technique that realizes high-precision time synchronization, and more specifically to a technique that realizes high-precision and stable time synchronization even in an environment in which a navigation satellite signal of a satellite positioning system (GNSS: Global Navigation Satellite System) cannot be captured at all times.

BACKGROUND ART

As a means of realizing high-precision time (phase) synchronization between base stations, which is required for mobile communication systems using a time division duplex (TDD) method, the use of a GNSS such as a GPS (Global Positioning System) is expanding. A GNSS satellite (navigation satellite) carries a high-precision timepiece synchronized with coordinated universal time (UTC), and transmits a navigation satellite signal synchronized with the same by means of a radio wave. By receiving the navigation satellite signal of the navigation satellite, it becomes possible to perform time synchronization with UTC at any location on earth.

However, since a propagation delay occurs in a navigation satellite signal from a navigation satellite before it reaches a reception point, it is necessary to simultaneously receive signals from at least four navigation satellites in order to correct the delay time, and to specify four parameters (x, y, z, t), namely, three-dimensional coordinate information of the signal reception location (x, y, z), and reception time information (t). In the case of a GPS, at least 24 navigation satellites are currently in operation, orbiting earth on six semi-geo-synchronous orbits (satellite orbits with a revolution period of half a sidereal day) with a period of approximately 12 hours. In order to constantly realize positioning and time synchronization, it is necessary to select an environment where at least four of these navigation satellites are able to be captured at all times.

When using a GNSS for the purpose of high-precision time synchronization, there is a case where the line of sight space of the navigation satellite signal is blocked by buildings, trees, and the like, and the navigation satellite signal temporarily cannot be received. Generally, base stations of a mobile communication system tend to be installed at a higher density in urban areas where traffic demand is high. According to a report that estimates the reception state of a navigation satellite signal by a simulation (refer to Non-Patent Document 1), areas that can capture four or more navigation satellite signals at all times in an urban area (Shinjuku subcenter area) are limited to 13.5% by area ratio (however, building rooftops and the like are excepted). Consequently, it is a problem to realize high-precision and stable time synchronization in an environment where it is difficult to capture the required number of navigation satellite signals at all times, and where the reception state of the navigation satellite signals is poor.

Conventionally, as a method of maintaining the time synchronization precision of a system when a navigation satellite signal temporarily cannot be received due to the influence of reception obstacles of the navigation satellite signal, such as buildings and trees, a method that performs a holdover (hereunder H/O) operation that reactively switches a reference signal to an internal or external high-precision clock signal according to the reception state of the navigation satellite signal (reception signal strength, S/N ratio, and the like) is carried out.

That is to say, it is a method that constantly realizes high-precision time synchronization by means of a system clock temporarily stopping time synchronization dependent on a navigation satellite signal at a point in time where the reception state of the navigation satellite signal deteriorates or can no longer be received, and switching to a self-run operation using a clock signal that is internal or external to the device as a reference signal, such that the timing (phase) at the time of the slave synchronization is maintained, and then switching back to time synchronization by means of the navigation satellite signal again at a point in time when the reception state of the navigation satellite signals becomes satisfactory.

In this case, the precision of the system clock, that is to say, the time synchronization precision, is affected by the frequency precision of the clock signal used at the time of a H/O. The longer the duration of a H/O, the larger the difference between UTC and the system clock time. Consequently, it is necessary to limit the period in which a H/O is consecutively performed within a range that can maintain the required time synchronization precision (refer to Non-Patent Documents 2 and 3).

In addition, it is known that in time synchronization by a GNSS, the time synchronization precision is affected by the influence of a multipath, in which a navigation satellite signal is received as a reflected wave in addition to being received as a direct wave (refer to Non-Patent Document 4).

PRIOR ART DOCUMENTS

Non-Patent Documents

[Non-Patent Document 1] Tomohiro Hakamata, Yusuke Konishi, Suh Yongcheol, and Ryosuke Shibasaki, "Improvement of a GNSS Utility Evaluation Simulation System Using a Three-Dimensional Map", Geoinformation Forum Japan 2003, Student Forum, Center for Spatial Information Science, Tokyo University, Jun. 11, 2003

[Non-Patent Document 2] C. W. T. Nicholls and G C. Carleton, "Adaptive OCXO Drift Correction Algorithm", 2004 IEEE International Ultrasonics, Ferroelectrics, and Frequency Control Joint 50th Anniversary Conference, pp. 509-517, 2004

[Non-Patent Document 3] EDN Japan, "Network Timing Management", ITmedia Inc., [online], [searched Jan. 18, 2015], Internet <URL: http://ednjapan.com/edn/articles/0611/01/news151.html>

[Non-Patent Document 4] Nobuaki Kubo, Akio Yasuda, and Takashi Suzuki, "The Possibility of the Precise Positioning and Multipath Error Mitigation", IEICE Technical Report, ITS2004-8, pp. 7-12, July 2004

[Non-Patent Document 5] H. Izumikawa and Y. Kishi, "GREEN-CANES: Adaptive Activation Controls of Macro/

Femtocell Base Stations for Energy Savings", IEICE Technical Report, NS2009-257, pp. 533-536, March, 2010

[Non-Patent Document 6] Renata Pelc-Mieczkowska, "Primary results of using hemispherical photography for advanced GPS mission planning", The 9th International Conference "ENVIRONMENTAL ENGINEERING", Vilnius Gediminas Technical University, May, 2014

SUMMARY OF THE INVENTION

Problem to be Solved by the Invention

In time synchronization by a conventional GNSS, problems of a method that reactively performs a H/O according to the reception state of a navigation satellite signal include the following aspects.

(1) Since the future reception state of a navigation satellite signal is unknown, there is a case where the required time synchronization precision cannot be maintained when a WO period continues for a long time.

(2) Frequent switching to H/O occurs in a state where a navigation satellite signal is weak. That is to say, a situation occurs in which the reference signal of a time synchronization system frequently switches, and there is a case where system operation becomes unstable.

(3) There is a case where, in addition to a signal propagated from a navigation satellite being received in a visible (Line of Sight: LOS) environment, a navigation signal is received as a reflected wave. In this case, the system does not switch to a H/O, and the time synchronization precision can further deteriorate.

(4) If an operation is performed where activation and stopping of a base station is scheduled according to traffic demand for the purpose of power savings in the base station of the mobile communication system, the reception state of a navigation satellite signal when the base station is activated is unknown. Consequently, there is a case where it becomes difficult to activate the time synchronization system in conjunction with an activation operation of the base station (refer to Non-Patent Document 5).

Means for Solving the Problem

The present invention has been achieved in view of the problems described above, and is characterized by proactively switching to a H/O state by presetting beforehand and scheduling, based on information relating to the temporal reception characteristics of a navigation satellite signal at a certain location (information such as simulation data of the navigation satellite signal reception characteristics based on the navigation satellite orbit information, and spatial information or three-dimensional map data of the surroundings of the navigation satellite signal antenna, and pre-measured navigation satellite signal reception characteristics data), a time period in which time synchronization is performed using the navigation satellite signal (first time period), and a time period in which a H/O is performed (second time period). Furthermore, by setting an allowed time for the time period in which the H/O is consecutively performed within a duration in which the required time synchronization precision can be maintained based on the frequency precision of the clock signal used in the H/O, a constantly high time synchronization precision can be maintained.

According to the method of the present invention, it becomes possible to realize high-precision and stable time synchronization even in an environment in which the required number of navigation satellite signals is temporarily unable to be captured, and the reception state of the navigation satellite signal is not satisfactory.

In order to solve the problems mentioned above, the present invention proposes a time synchronization device that is capable of selecting whether synchronization with a predetermined standard time by a timepiece unit is performed by receiving a radio wave including information relating to the predetermined standard time and using time information based on the received radio wave, or is performed by means of a holdover instead of the time information, the holdover being performed using a clock signal from an internal or external clock source, the timepiece unit generating a time signal synchronized with the predetermined standard time and outputting the time signal to an exterior, the device including:

a schedule determination unit that determines a schedule according to temporal reception characteristics of the radio wave at a reception location of the radio wave, the schedule having a first time period in which time synchronization is performed using the time information based on the received radio wave, and a second time period in which time synchronization is performed by means of the holdover;

a clock signal selection unit that selectively supplies to the timepiece unit either one of the time information based on the received radio wave, and the clock signal from the internal or external clock source; and a control unit that controls the clock signal selection unit according to the schedule determined by the schedule determination unit.

The present invention further proposes a time synchronization method that is capable of selecting whether synchronization with a predetermined standard time by a timepiece unit is performed by receiving a radio wave including information relating to the predetermined standard time and using time information based on the received radio wave, or is performed by means of a holdover instead of the time information, the holdover being performed using a clock signal from an internal or external clock source, the timepiece unit generating a time signal synchronized with the predetermined standard time and outputting the time signal to an exterior, the method including:

the step of determining a schedule according to temporal reception characteristics of the radio wave at a reception location of the radio wave, the schedule having a first time period in which time synchronization is performed using the time information based on the received radio wave, and a second time period in which time synchronization is performed by means of the holdover; and the step of, according to the determined schedule, supplying, in the first time period, the timepiece unit with the time information based on the received radio wave, and supplying, in the second time period, the timepiece unit with the clock signal from the internal or external clock source.

Effect of the Invention

According to the present invention, an effect in which high-precision and stable time synchronization is realized even in an environment where the reception state of a navigation satellite signal is not satisfactory is obtained.

EMBODIMENTS FOR CARRYING OUT THE INVENTION

Figure 1:
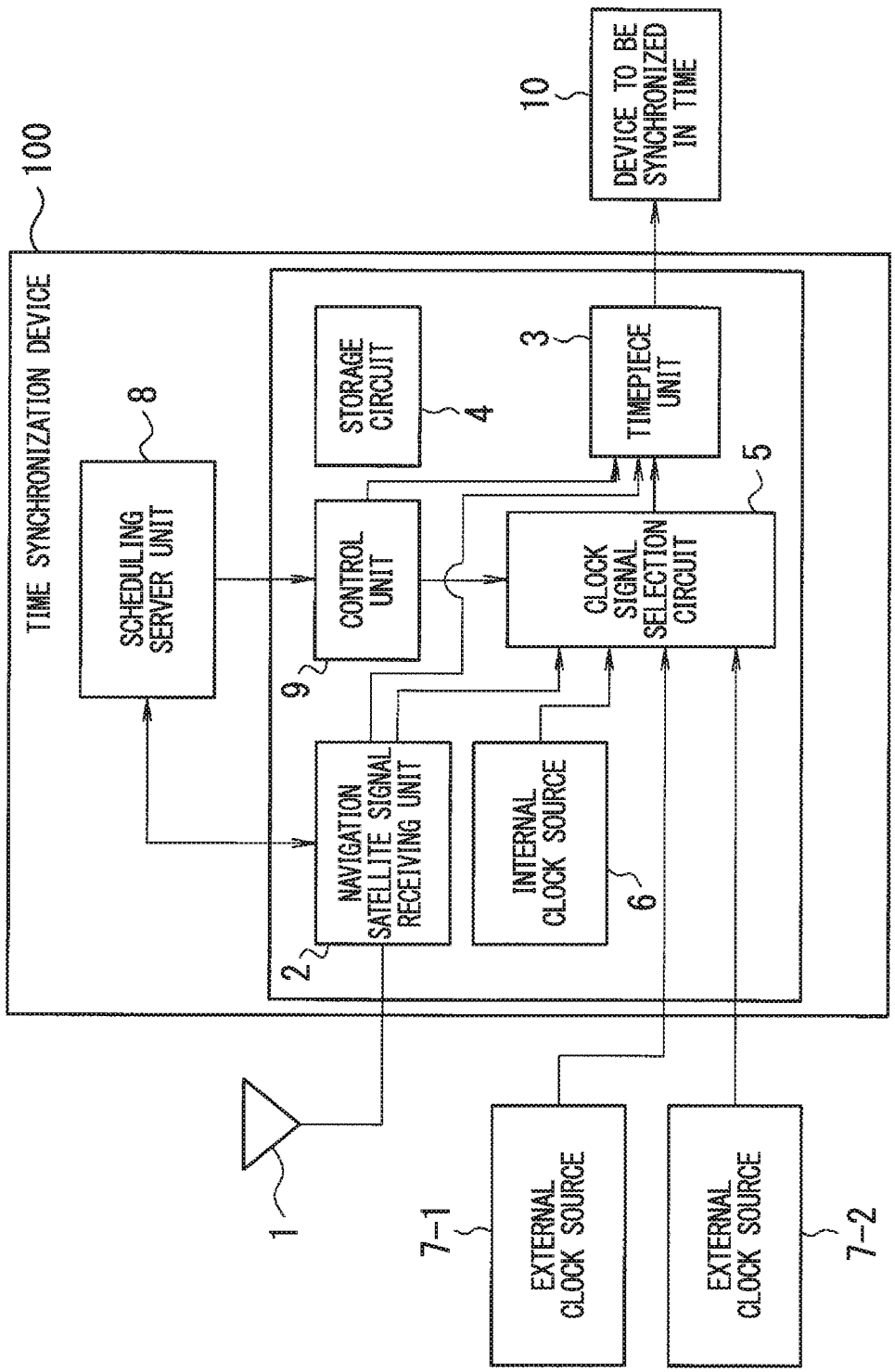
FIG. 1 is a configuration diagram showing a configuration of a time synchronization device according to an embodiment of the present invention.

A configuration of an entire time synchronization system, which includes a time synchronization device according to an embodiment of the present invention, is shown in FIG. 1.

As shown in FIG. 1, a time synchronization device 100 is configured by a navigation satellite signal antenna 1, a navigation satellite signal receiving unit 2, a timepiece unit 3, a storage circuit 4, a clock signal selection circuit (clock signal selection unit) 5, an internal clock source 6, external clock sources 7-1 and 7-2, a scheduling server unit (schedule determination unit) 8, and a control unit 9.

The navigation satellite signal antenna 1 is an antenna for receiving a navigation satellite signal.

The navigation satellite signal receiving unit 2 is a functional unit that receives a plurality of navigation satellite signals, and calculates and outputs time information at a reception location.

The timepiece unit 3 is a functional unit that operates the time of the present time synchronization system.

The storage circuit 4 is a circuit for storing various data.

The clock signal selection circuit 5 is a circuit for switching a supply source of a reference signal used by the timepiece unit 3 for operation of the time.

The internal clock source 6 and the external clock sources 7-1 and 7-2 are respectively devices that are arranged on the interior and exterior of the device, and generate a clock signal.

The number of external clock sources (7) selectable by the clock signal selection circuit 5 is in no way limited to two as in the present embodiment, and can be made an arbitrary n sources (where n is any of 1 to N).

The scheduling server unit 8 is a functional unit that generates a H/O schedule, or more specifically a schedule that includes a first time period, in which time synchronization is performed using time information based on a received navigation satellite signal, and a second time period, in which time synchronization is performed by means of a H/O.

The control unit 9 is a functional unit for controlling time synchronization according to the schedule.

Hereunder, configurations and operations of the respective functional units are described in detail.

The navigation satellite signal antenna 1 is connected to the navigation satellite signal receiving unit 2 by a coaxial cable or the like, and transmits a received navigation satellite signal.

As a result of simultaneously receiving signals from at least four navigation satellites, the navigation satellite signal receiving unit 2 specifies, by means of a calculation, four parameters, namely three-dimensional coordinate information (x, y, z) of the signal reception location and reception time information (t), and corrects the timing in which the time information is received from the navigation satellite based on a propagation delay time from the location of the navigation satellite to the reception point.

Furthermore, the navigation satellite signal receiving unit 2 outputs to the timepiece unit 3, the time information generated in this manner, and which is synchronized with the navigation satellite. The time information uses, as an example, a timing signal synchronized with the navigation satellite signal having a signal format such as 1 PPS (Pulse Per Second), and time code data for notifying information (ToD: Time of the Day) relating to an absolute time in hours and seconds, or the like, and having a format such as NMEA (National Marine Electronics Association) 0183.

The navigation satellite signal receiving unit 2 may be installed inside the device, or a navigation satellite signal receiving device placed outside the device may be used. The navigation satellite signal receiving unit 2 can store reception location information that is calculated by positioning by means of a navigation satellite signal. In this case, provided that the location of the navigation satellite signal antenna 1 is not moved, it is possible to perform time synchronization thereafter by receiving at least one navigation satellite signal.

The timepiece unit 3 is responsible for operation of the system time, and generates, based on the time information supplied from the navigation satellite signal receiving unit 2, a time signal synchronized with a predetermined standard time, which is here UTC as mentioned above. Specifically, the timepiece unit 3 has an oscillator and a phase locked loop (PLL) mounted inside, and at the same time as it dependently synchronizes the timing with respect to a 1PPS signal supplied from the navigation satellite signal receiving unit 2, it generates time information consistent with the absolute time according to ToD information supplied from the navigation satellite signal receiving unit 2.

Furthermore, the timepiece unit 3 is responsible for the role of supplying a time signal with respect to a device 10 (device to be synchronized in time) in which time synchronization is to be performed and which is external to the device. As the time information used at this time, in addition to the 1PPS/ToD described above, a case is also anticipated in which a PTP (Precision Time Protocol) protocol prescribed by IEEE 1588 version 2 is used and the time information is supplied via a packet communication interface such as Ethernet®.

At the time of a H/O, the timepiece unit 3 stops referring to the time information from the navigation satellite signal receiving unit 2, based on control by the control unit 9.

The storage circuit 4 is a device for storing and holding data relating to a schedule input from the scheduling server unit 8, and other system data.

The clock signal selection circuit 5 is a functional unit for switching a reference signal which is used by the timepiece unit 3 to operate the time, between a timing signal supplied from the navigation satellite signal receiving unit 2, and a clock signal supplied from the internal clock source 6 or the external clock source 7-1 or 7-2. That is to say, it is switched such that the timing signal supplied from the navigation satellite signal receiving unit 2 is output to the timepiece unit 3 at the time of the timepiece unit 3 being synchronized with the navigation satellite signal receiving unit 2 and the clock signal supplied from the internal clock source 6 or the external clock source 7-1 or 7-2 is output to the timepiece unit 3 at the time of H/O.

The internal clock source 6 and the external clock sources 7-1 and 7-2 are functional units internal or external to the device, that generate and output a clock signal, and oscillators made from quartz, rubidium, cesium, and the like, are anticipated. Furthermore, the external clock sources 7-1 and 7-2 are in no way limited to the oscillators described above, and connection to a communication interface of a node device of a wide area network, such as a SDH (Synchronous Digital Hierarchy), an ATM (Asynchronous Transfer Mode), or Ethernet, and slave synchronization with respect to the same can also be considered.

Figure 2:
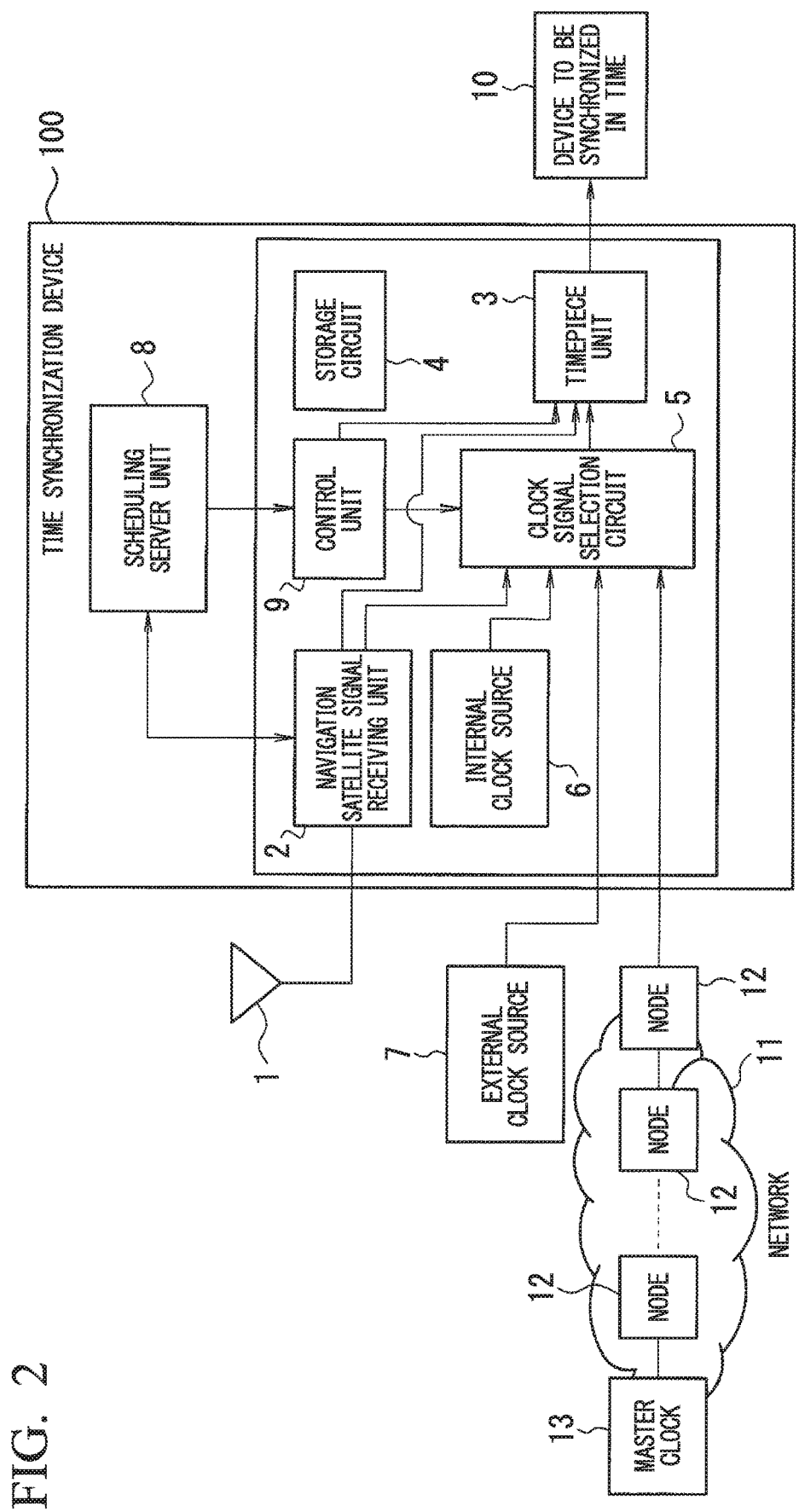
FIG. 2 is a configuration diagram showing a modification of the same embodiment.

FIG. 2 shows a modification of the present embodiment and represents such an embodiment. In the present example, an example is shown in which a clock signal from a master clock 13 transmitted via nodes 12 of a network 11 is used.

The scheduling server unit 8 is a functional unit for receiving and holding information relating to the temporal reception characteristics of a satellite signal, calculating a schedule that performs a H/O based on the same, and supplying it to the control unit 9. Details of an operation thereof are mentioned below.

The control unit 9 is a functional unit that controls, based on the H/O schedule data supplied from the scheduling server unit 8, the operation of the clock signal selection circuit 5, which performs switching of the reference signal used by the timepiece unit 3 when operating the time.

Next, a procedure that determines a H/O schedule in the scheduling server unit 8 is described.

The scheduling server unit 8 firstly acquires information relating to the temporal reception characteristics of a navigation satellite signal at the installation location of the navigation satellite signal antenna. The information relating to the temporal reception characteristics of the navigation satellite signal are obtained by a simulation or from actual measurement data by receiving a navigation satellite signal.

As data acquisition methods by a simulation, there are a method that uses the orbit information of a navigation satellite and the spatial information of the surrounding environment of the navigation satellite signal antenna to simulate the number of temporally captured satellites in the LOS environment (refer to Non-Patent Document 6), and a method that considers obstacles surrounding the satellite antenna installation location from orbit information of the navigation satellite and three-dimensional map data to simulate the number of temporally captured satellites (refer to Non-Patent Document 1).

In a case where the temporal reception characteristics of a navigation satellite signal is obtained by a simulation, the required orbit information of the navigation satellite is acquired and updated by the scheduling server unit 8.

It is anticipated that almanac data, ephemeris data, and the like, are used as the orbit information of a navigation satellite. The almanac data and the ephemeris data of satellites are published by public institutions such as the USCG (United States Coast Guard Navigation Center (URL: http://www.navcen.uscg.gov)) in the United States and JAXA (Japan Aerospace eXploration Agency (URL: http://qz-visionjaxajp/USE/)).

Furthermore, the orbit information of a navigation satellite can also be acquired from a navigation satellite signal. In this case, the orbit information of the navigation satellite is input from the navigation satellite signal receiving unit 2 to the scheduling server unit 8.

As acquisition methods of the temporal reception characteristics of a navigation satellite signal by actual measurement data include, there are a method of acquiring data by measuring the temporal reception characteristics of the navigation satellite signal beforehand, and a method of correcting the temporal reception characteristics of the navigation satellite signal obtained by a simulation according to the measured temporal reception characteristics data of the navigation satellite signal.

Figure 3:
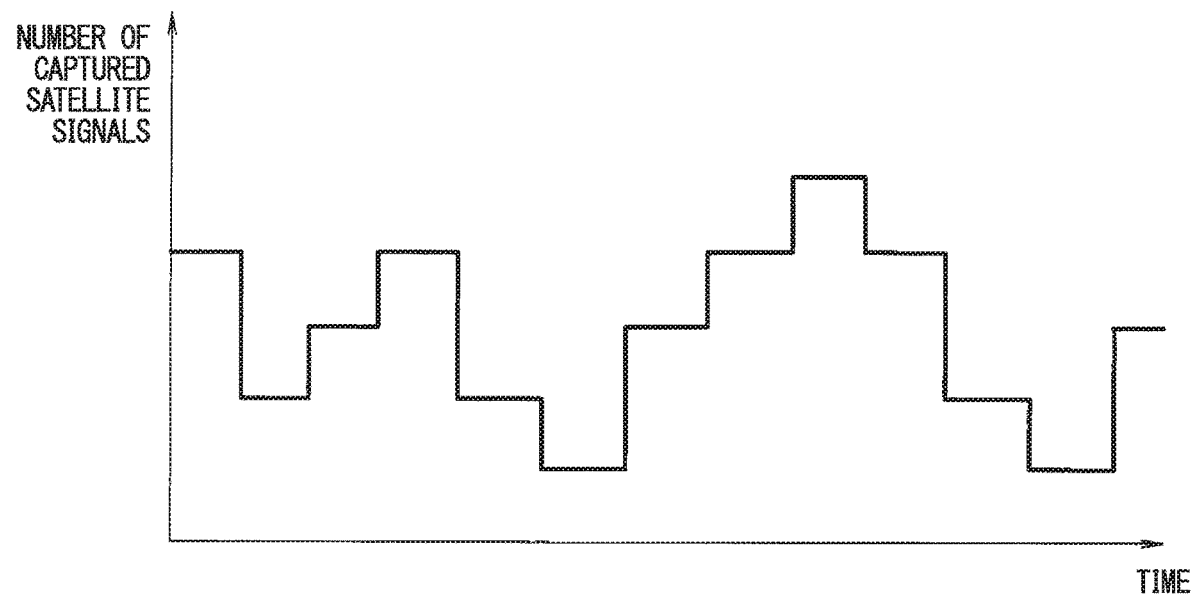
FIG. 3 is an explanatory diagram showing an example of information relating to the temporal reception characteristics of a navigation satellite signal.

This information relating to the temporal reception characteristics of a navigation satellite signal is provided, as shown as an example thereof in FIG. 3, as temporal data representing the number of captured navigation satellite signals. The data may be provided with identification numbers of the navigation satellites that can be received, and coordinate information of the navigation satellites on the celestial sphere centered on the location of the navigation satellite signal antenna 1.

The sequence of scheduling determination in the scheduling server unit 8 basically performs scheduling such that, based on the temporal reception characteristics data of a navigation satellite signal, switching to a H/O is performed during a time period in which the required number of navigation satellites cannot be captured.

Here, the required time synchronization precision is represented by X, and the frequency precision of an internal or external clock signal source i used in a H/O is represented by Yi. These values are input to the scheduling server unit 8 beforehand, and the value of the maximum allowed time of a consecutive H/O for a case using the clock signal source i with respect to the required time synchronization precision X is calculated by X/Yi.

For example, given a required time synchronization precision of one microsecond ($1 \times 10^{-6}$ sec) between base stations using the TD-LTE (Time Division Long Term Evolution) method, which represents a TDD-type LTE (Long Term Evolution) communication method, and a clock signal frequency precision of 0.1 ppb (parts per billion: $10^{-9}$) for the precision of a rubidium oscillator and 0.01 ppb for the precision of a cesium oscillator, the maximum allowed time of a consecutive H/O is $10^4$ sec in a case where the H/O is performed using a rubidium oscillator, and $10^5$ sec in the case of a cesium oscillator.

The scheduling server unit 8 performs H/O scheduling by selecting a clock signal source i having the required precision according to the length of time in which the required number of satellite signals cannot be captured, from the temporal reception characteristics data of the navigation satellite signal. The schedule determination may be performed automatically, or it may include a partial manual operation.

Figure 4:
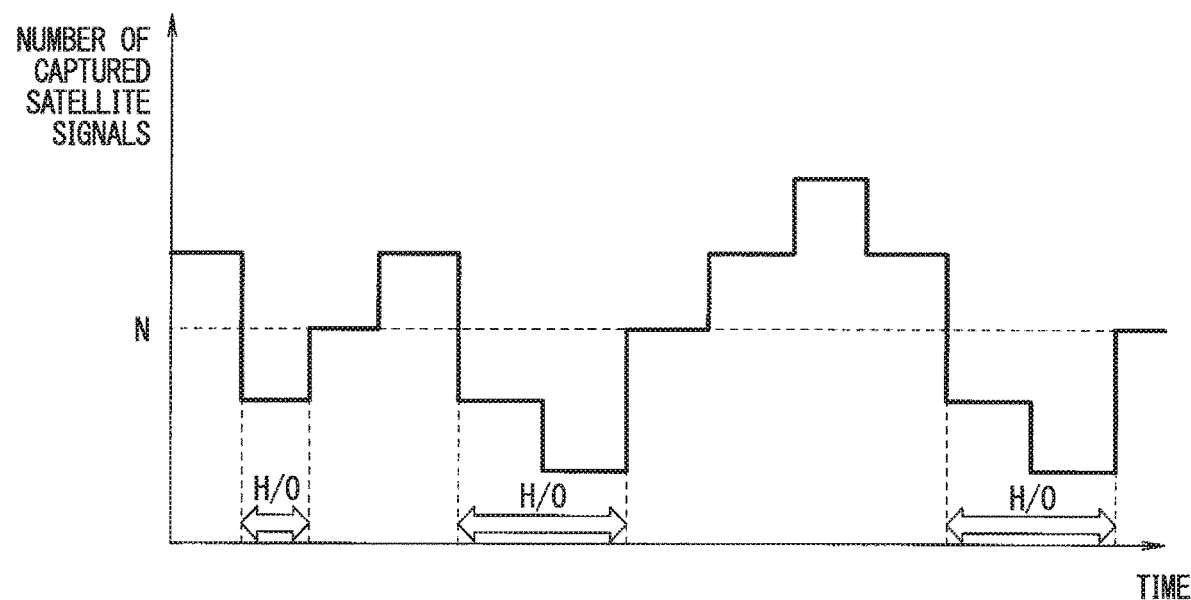
FIG. 4 is an explanatory diagram showing an example of a schedule setting in the present invention.

FIG. 4 shows an example of a schedule setting when a H/O is performed in a case where the number of captured navigation satellite signals has fallen below N.

As mentioned above, in a case where time synchronization is performed by a GNSS, the number of required navigation satellites to be captured when the time synchronization system is activated is normally at least four. However, once the positioning and time synchronization processes are completed, in a case where the location of the navigation satellite signal antenna 1 is not moved thereafter, it becomes possible to perform time synchronization by holding the positioned location information, provided that a minimum of one navigation satellite can be captured thereafter.

In addition, there is a method of inputting location information of the navigation satellite signal antenna 1 beforehand. An example of an input method of location information is a method in which there is input from the exterior, location information automatically generated from map data by specifying a point on a map, location information output from map data based on an address (in practice, the corresponding coordinate information) and floor information (that is to say, height information), or location information acquired by performing positioning at the installation location of the navigation satellite signal antenna 1.

If the location information is held in the storage circuit 4 and at least one satellite signal can be received, it is possible to perform time synchronization with UTC by means of the navigation satellite signal receiving unit 2 using the location information to perform correction of the propagation delay based on a relative location to the location of the satellite. Therefore, in this case, if at least one navigation satellite can be captured, time synchronization dependent on a navigation satellite signal is performed. Furthermore, if no satellites can be captured, scheduling is performed such that a H/O using an internal or external clock signal source as a reference signal is performed.

In the case of time synchronization of a base station as mentioned above, if a H/O is performed by means of a cesium oscillator, it is adequate if time synchronization can be performed at least once per day by receiving a single navigation satellite signal. Therefore, it is possible to realize high-precision time synchronization by a GNSS even in areas where time synchronization conventionally could not be applied, such as indoors.

In a case where a network interface is used as an external clock source as shown in FIG. 2, each node 12 that configures the SDH or ATM network 11 performs slave synchronization with respect to an upper node 12 nearer the master clock 13, thereby maintaining the frequency precision of the master clock 13 and transmitting the clock signal. In the case of Ethernet, a layer 2 switch corresponding to SyncE (Synchronous Ethernet) and the like is used as a slave synchronization node (upper node).

As the clock precision in a case where a network interface is used as an external clock source, the precision of the oscillator of the master clock 13 used by the network 11 is referred to. For example, the use of different clock sources is anticipated such that a clock signal from a rubidium oscillator, which has an inferior precision but is mounted within a device with a higher reliability, is used if a H/O is performed for a short period, and synchronization to the clock signal of the master clock based on a cesium oscillator is performed by means of the network interface if a H/O is required for a long period.

In a conventional time synchronization method according to a reactive H/O based on the reception state of a navigation satellite signal, there is a problem in that a H/O frequently occurs when the satellite signal is weak, and the operation of the system becomes unstable.

Figure 5:
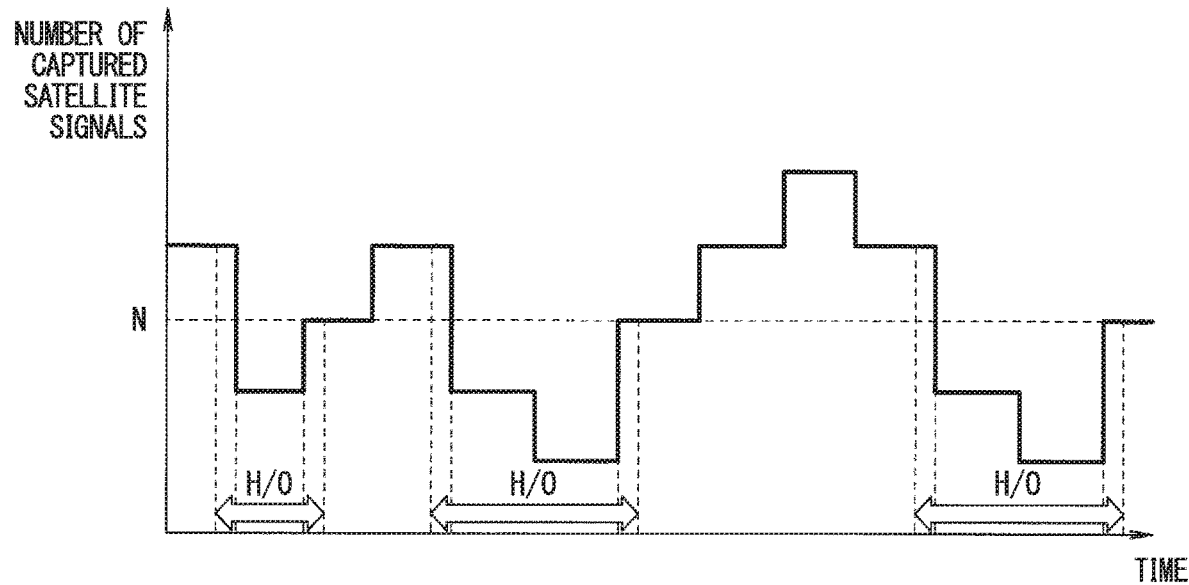
FIG. 5 is an explanatory diagram showing an example of a schedule setting that realizes stable time synchronization.

The present invention performs scheduling of the time in which a H/O is performed beforehand, being a method that proactively performs a WO. It selects a H/O, from the reception characteristics data of the navigation satellite signal, in a time period in which the signal is weak, and in a time period at a boundary where the number of captured navigation satellites changes to a state that falls below the required number. Moreover it lengthens the time in which a H/O is performed in a range in which the time synchronization precision can be maintained. In other words, by adding a fixed period before and after the time period of the boundary and performing a schedule setting having a sufficient margin, it is possible to realize stable time synchronization. FIG. 5 shows an example of such a schedule setting.

Providing a margin in the execution time of a WO in this manner is expected to have this effect, even considering the divergence between the reception characteristics of a navigation satellite signal resulting from a simulation, and the reception characteristics of an actual satellite signal.

There is a case where the navigation satellite signal is not a direct wave in a LOS environment, but is received as a reflected wave as a signal reflected by buildings in the surroundings of the satellite antenna. In this case, if the reflection point is distant from the reception location of the navigation satellite signal antenna 1, a propagation delay occurs due to a difference in the propagation distance, causing an error in the time synchronization. For example, if a difference in the propagation distance of 300 m occurs, it results in an error in the time synchronization of approximately 1 microsecond.

When such a multipath signal is received, it is normally a signal from a satellite with a low elevation angle. Consequently, a method can be considered that selectively performs a H/O in a time period in which there is a possibility, based on the reception characteristics data of the navigation satellite signal, of receiving a satellite with a low elevation angle causing a multipath signal. Furthermore, in a case where a sufficient number of captured navigation satellites with a high elevation angle is expected, a high-precision time synchronization, which avoids deterioration of the time synchronization precision arising from the reception of a multipath signal, can be realized by a method in which the navigation satellites used for time synchronization are determined to be satellites having a high elevation angle by scheduling beforehand. Selection of a navigation satellite used in time synchronization is realized by referring to the coordinate information of the navigation satellite on the celestial sphere from the information relating to the temporal reception characteristics of the navigation satellite signal.

Furthermore, using a large number of navigation satellite signals from satellites having a high elevation angle that are spatially distributed over as wide a range as possible is effective for improving the time synchronization precision. Performing synchronization by selecting, based on information relating to the temporal reception characteristics of the navigation satellite signal, navigation satellite signals having a high elevation angle that are spatially distributed over a wide range in a time period in which reception of navigation satellite signals from satellites having a high elevation angle can be realized, and then selectively performing a H/O in other time periods, becomes an effective means to improve the time synchronization precision.

In the manner above, in addition to scheduling a H/O in the scheduling server unit 8, scheduling is also performed with respect to selection of the navigation satellite to be used for the time synchronization in a first time period, in which time synchronization is performed using time information based on a received navigation satellite signal. In this case, information of the navigation satellite to be used in time synchronization is notified from the scheduling server unit 8 to the navigation satellite signal receiving unit 2.

Next, a power saving operation is described.

Figure 6:
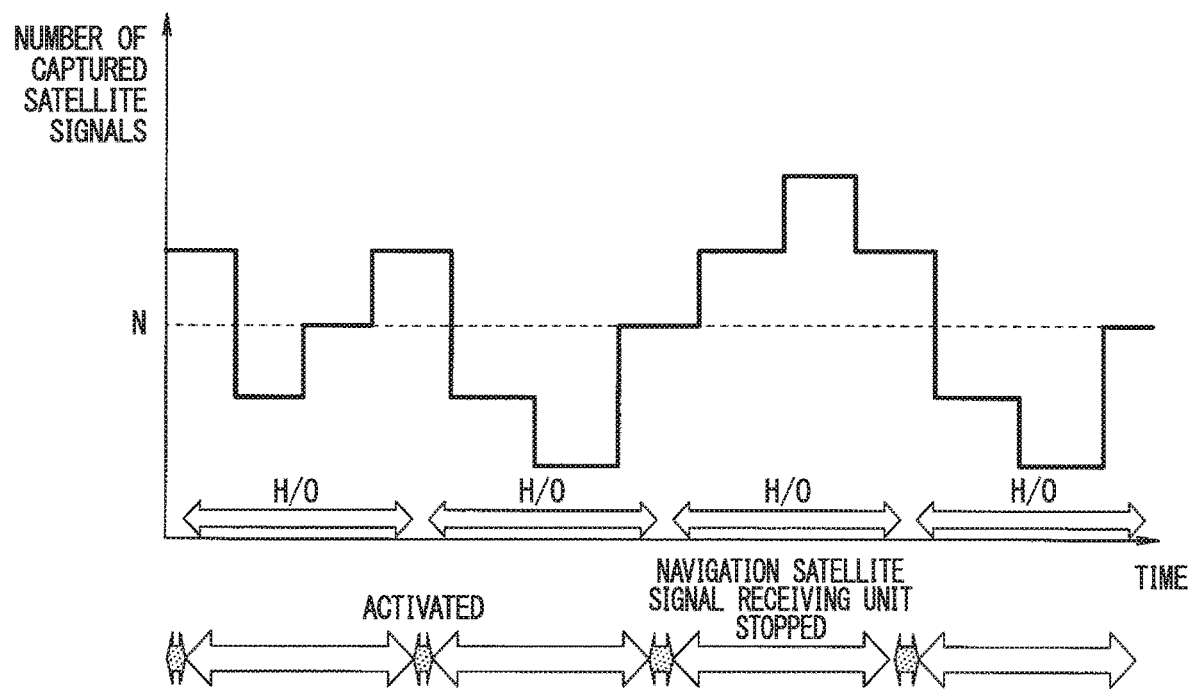
FIG. 6 is an explanatory diagram showing an example of a schedule setting that realizes power savings.

According to the proactive H/O of the present invention, as shown in FIG. 6, by performing time synchronization by means of a navigation satellite in a minimal time period, and selectively performing a H/O in other time periods, it is possible to temporarily stop the navigation satellite signal receiving unit 2.

The navigation satellite signal receiving unit 2 may be a navigation satellite signal receiving device placed outside the device. In this case, it is possible to perform a power saving operation by activating the navigation satellite signal receiving device only when required.

On the other hand, a case where a system which performs time synchronization based on time information from the timepiece unit 3, performs a power saving operation can also be considered. For example, a case of a power saving operation is anticipated in which a mobile communication base station performs activation and stopping by a schedule determined beforehand according to traffic demand. In this case, there is a problem in that there is no guarantee that the base station is able to always receive a navigation satellite signal at the time it is activated.

Figure 7:
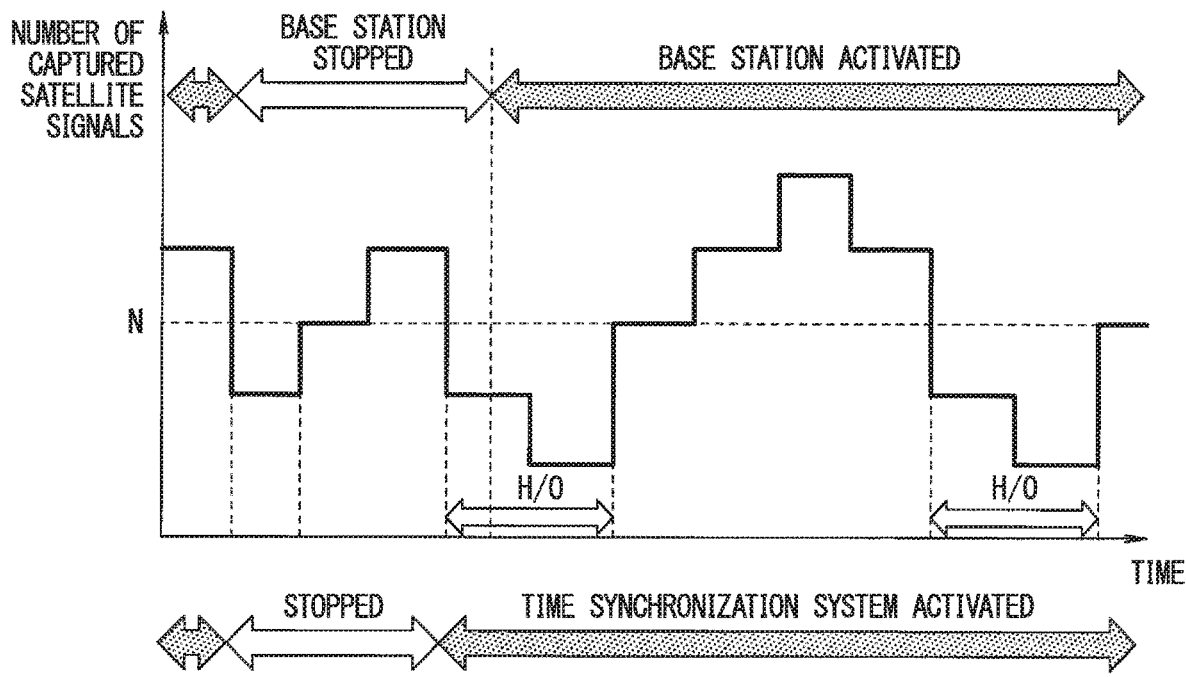
FIG. 7 is an explanatory diagram showing another example of a schedule setting that realizes power savings.

According to the present invention, the H/O operation time in which time synchronization precision can be maintained is considered, and the time synchronization system is activated at a time before activation of the base station is scheduled and at a time in which time synchronization by means of a navigation satellite is possible. Thereafter, a H/O is performed in the time synchronization system up until the time the base station is activated. By so doing, it is possible for the base station to perform time synchronization at the scheduled activation time even in a case where a navigation satellite signal cannot be received at the time the base station is activated. An example of such a schedule setting is shown in FIG. 7.

The functional units of the time synchronization system of the present invention may be placed at the same location, or a portion may be installed at a different location.

For example, an operation such as the scheduling server unit 8 being installed in a data center or installed on the cloud is anticipated. In this case, performing an operation such as transmission of schedule data via a network interface used for the external clock source is also anticipated. Furthermore, in the same manner, transmission of orbit information of a navigation satellite via a network interface is also anticipated.

Figure 8:
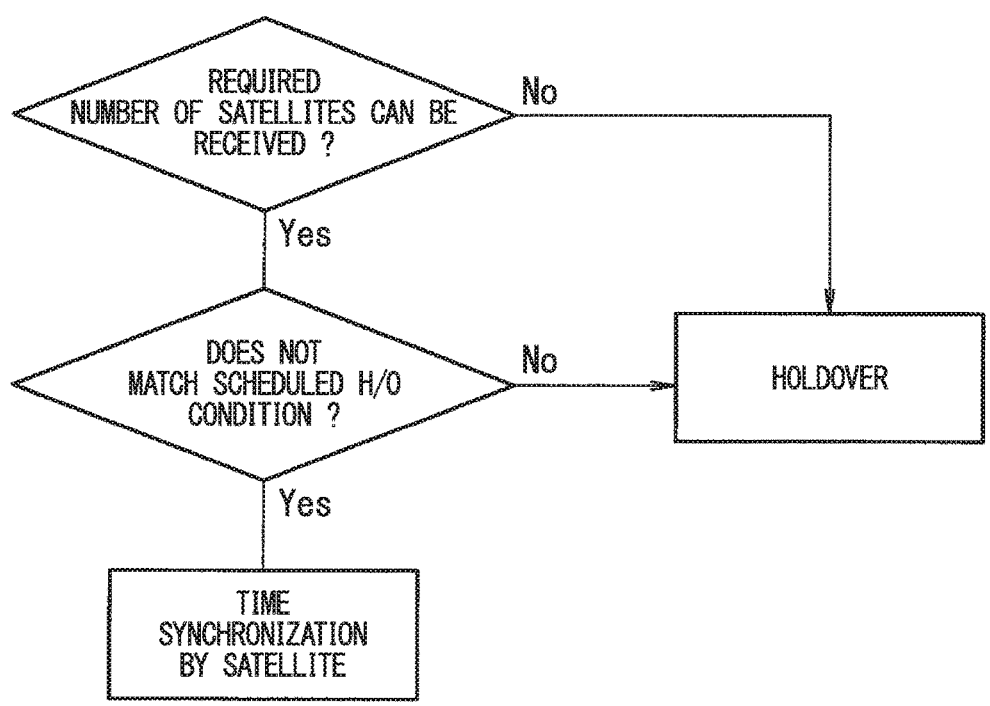
FIG. 8 is an explanatory diagram showing an example of a flowchart in a case where a conventional H/O and the method of the present invention are combined.

Moreover, a case is anticipated where time synchronization by means of a navigation satellite signal cannot temporarily be performed due to the occurrence of an unexpected situation such as a failure of the navigation satellite signal antenna 1 or reception of an interfering radio wave. Therefore a conventional method that reactively performs a holdover according to the reception state of a navigation satellite signal, and the proactive holdover method of the present invention may be used in combination. FIG. 8 shows a flowchart of an example of a case where such an operation is performed.

As described above, according to the present invention, even in an environment where the reception environment is not satisfactory, and in which the required number of navigation satellite signals cannot temporarily be captured, it is possible to realize high-precision and stable time synchronization by performing a proactive H/O scheduled in a period in which the time synchronization precision can be maintained according to the precision of the clock signal used in the H/O.

More specifically, the following effects can be obtained.

(A) High-precision time synchronization can be constantly realized even in an environment where the required number of navigation satellite signals cannot be received at all times, by proactively scheduling a H/O based on information (temporal simulation data of the navigation satellite signal reception characteristics based on the navigation satellite orbit information, and spatial information or three-dimensional map data of the surroundings of the navigation satellite signal antenna, and external information such as actual measurement data of the navigation satellite signal reception characteristics) relating to the temporal reception characteristics of a navigation satellite signal under conditions in which the required time synchronization precision can be maintained.

(B) Stable time synchronization can be realized by selectively performing a proactive H/O, based on information relating to the temporal reception characteristics of a navigation satellite signal, in a time period in which the navigation satellite signal is weak.

(C) Deterioration of the time synchronization precision caused by a propagation time difference of a reflected wave of a navigation signal can be inhibited by presetting a schedule such that, based on information relating to the temporal reception characteristics of a navigation satellite signal, time synchronization is performed by means of the navigation satellite signal in a time period in which it is possible to receive the navigation satellite signal as a direct wave, that is to say, in a LOS environment, and switching to a H/O is performed in other time periods.

(D) High-precision time synchronization can be realized by presetting a schedule such that, based on information relating to the temporal reception characteristics of a navigation satellite signal, time synchronization is performed by means of the navigation satellite signal in a time period in which it is possible to receive a plurality of navigation satellite signals that are spatially distributed over a wide range, and switching to a H/O is performed in other time periods.

(E) By holding the location information of the navigation satellite signal antenna beforehand, it becomes possible to realize time synchronization by means of a navigation satellite signal even in a state where only one navigation satellite signal can be captured, and by combining with a proactive H/O, the area in which high-precision time synchronization can be constantly realized by means of a navigation satellite signal is expanded.

In addition, according to the present invention, the following effects are anticipated with respect to a power saving operation of a device or system that performs time synchronization, and a system using the same (such as a base station facility).

(F) A power saving effect of the time synchronization system is expected by performing an operation that minimally activates the functional unit that receives a navigation satellite signal only when required to perform time synchronization by means of a navigation satellite.

(G) It becomes possible to realize power savings of a system (such as a base station facility) that utilizes time synchronization while maintaining the required time synchronization precision by activating, based on information relating to the temporal reception characteristics of a navigation satellite signal, the reception device of a navigation satellite signal beforehand in a period where a GNSS is usable.

INDUSTRIAL APPLICABILITY

According to the present invention, an effect in which high-precision and stable time synchronization is realized even in an environment where the reception state of a navigation satellite signal is not satisfactory is obtained.

REFERENCE SYMBOLS

1 Navigation satellite signal antenna
2 Navigation satellite signal receiving unit 3 Timepiece unit
4 Storage circuit
5 Clock signal selection circuit
6 Internal clock source
7 External clock source
8 Scheduling server unit
9 Control unit
10 Device to be synchronized in time
11 Network
12 Node
13 Master clock
100 Time synchronization device

The invention claimed is:

1. A time synchronization device comprising:
a timepiece unit that generates a time signal synchronized with a predetermined standard time and outputs the time signal to an exterior;
an acquisition unit that acquires temporal reception characteristics of a radio wave by a simulation or actual measurement and holds the acquired temporal reception characteristics, the radio wave including information relating to the predetermined standard time;
a schedule determination unit that determines a schedule according to the held temporal reception characteristics of the radio wave at a reception location of the radio wave, the temporal reception characteristics changing over time and indicating a predicted change in reception characteristics of the radio wave over a given period of time, the schedule having a first time period in which time synchronization is performed using time information based on the radio wave, and a second time period in which time synchronization is performed by means of a holdover, the holdover being performed proactively using a clock signal from an internal or external clock source;
a clock signal selection unit that selects whether synchronization with the predetermined standard time by the timepiece unit is performed by receiving the radio wave and using the time information based on the received radio wave, or is performed by means of the holdover instead of the time information, and selectively supplies to the timepiece unit either one of the time information based on the received radio wave, and the clock signal from the internal or external clock source; and
a controller that controls the clock signal selection unit according to the schedule determined by the schedule determination unit.

2. The time synchronization device according to claim 1, wherein a maximum consecutive allowable time of the second time period is set to within a time in which a time synchronization precision in the timepiece unit is consecutively higher than or equal to a required precision.

3. The time synchronization device according to claim 1, wherein a circuit that receives a radio wave including information relating to the predetermined standard time is stopped in the second time period.

4. The time synchronization device according to claim 1, wherein, in a case where a radio wave including information relating to the predetermined standard time is the radio wave transmitted from the satellite, a time period in which the radio wave from the satellite is weak, or a time period in which the radio wave from a required number of the satellite cannot be received, or a time period in which the radio wave cannot be received from the satellite as a direct wave, is determined as the second time period.

5. The time synchronization device according to claim 4, wherein a time period in which a fixed time is added before and after the time period in which the radio wave from the satellite is weak, or the time period in which the radio wave from the required number of the satellite cannot be received, or the time period in which the radio wave cannot be received from the satellite as a direct wave, is determined as the second time period.

6. The time synchronization device according to claim 1, wherein, in a case where a radio wave including information relating to the predetermined standard time is a radio wave transmitted from a satellite, among the satellite, a satellite scheduled beforehand is selected as a satellite from which a radio wave used for time synchronization in the first period is to be received.

7. A time synchronization method comprising:
the step of acquiring temporal reception characteristics of a radio wave by a simulation or actual measurement and holding the acquired temporal reception characteristics, the radio wave including information relating to a predetermined standard time:
the step of determining a schedule according to the held temporal reception characteristics of the radio wave at a reception location of the radio wave, the temporal reception characteristics changing over time and indicating a predicted change in reception characteristics of the radio wave over a given period of time, the schedule having a first time period in which time synchronization is performed using time information based on the radio wave, and a second time period in which time synchronization is performed by means of a holdover, the holdover being performed proactively using a clock signal from an internal or external clock source;
the step of selecting whether synchronization with the predetermined standard time by a timepiece unit that generates a time signal synchronized with the predetermined standard time and outputs the time signal to an exterior is performed by receiving the radio wave and using the time information based on the received radio wave, or is performed by means of the holdover instead of the time information; and
the step of, according to the determined schedule, supplying, in the first time period, the timepiece unit with the time information based on the received radio wave, and supplying, in the second time period, the timepiece unit with the clock signal from the internal or external clock source.

8. A non-transitory computer-readable medium encoded with a program that causes a computer to function as respective units of the time synchronization device according to claim 1.

* * * * *